US008121805B2

(12) United States Patent
Duan et al.

(10) Patent No.: US 8,121,805 B2
(45) Date of Patent: Feb. 21, 2012

(54) METHOD AND SYSTEM FOR DETERMINING LOCATIONS OF MOVING OBJECTS WITH MAXIMUM LENGTH SEQUENCES

(75) Inventors: Chunjie Duan, Medfield, MA (US); Raymond Yim, Cambridge, MA (US); Frederick J Igo, Jr., Ayer, MA (US); Amine Maaref, Montreal (CN)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 297 days.

(21) Appl. No.: 12/571,226

(22) Filed: Sep. 30, 2009

(65) Prior Publication Data

US 2011/0077905 A1    Mar. 31, 2011

(51) Int. Cl.
*G01B 7/04* (2006.01)
*G06F 15/00* (2006.01)

(52) U.S. Cl. ........................................ 702/95
(58) Field of Classification Search ................ 702/95
See application file for complete search history.

(56) References Cited

U.S. PATENT DOCUMENTS

| | | | | |
|---|---|---|---|---|
| 3,898,611 A * | 8/1975 | Mandel | ........................ | 187/399 |
| 4,342,021 A | 7/1982 | Schaller | | |
| 4,415,885 A | 11/1983 | Mongeon | | |
| 4,630,026 A * | 12/1986 | Lewis | ........................ | 187/399 |
| 5,135,081 A * | 8/1992 | Watt et al. | ........................ | 187/394 |
| 5,196,846 A | 3/1993 | Brockelsby et al. | | |
| 5,682,024 A * | 10/1997 | Koopman et al. | ........................ | 187/394 |
| 6,252,507 B1 | 6/2001 | Gagnon | | |
| 6,546,249 B1 * | 4/2003 | Imai et al. | ........................ | 455/436 |
| 7,408,654 B1 * | 8/2008 | Hardin et al. | ........................ | 356/617 |
| 7,537,092 B2 | 5/2009 | Birrer et al. | | |
| 7,562,747 B2 | 7/2009 | Marchesi | | |
| 2003/0053654 A1 * | 3/2003 | Patterson et al. | ........................ | 382/100 |
| 2004/0216320 A1 * | 11/2004 | Birrer et al. | ........................ | 33/708 |
| 2004/0259098 A1 * | 12/2004 | Lamy et al. | ........................ | 435/6 |
| 2006/0217884 A1 * | 9/2006 | Adachi | ........................ | 701/210 |
| 2009/0109030 A1 * | 4/2009 | Do et al. | ........................ | 340/572.1 |
| 2009/0153147 A1 | 6/2009 | Aizawa | | |
| 2009/0278642 A1 * | 11/2009 | Fullerton et al. | ........................ | 335/284 |

* cited by examiner

*Primary Examiner* — Cindy H Khuu

(74) *Attorney, Agent, or Firm* — Dirk Brinkman; Gene Vinokur

(57) ABSTRACT

A location of an object is determined by arranging a sequence of bits on a substrate. The sequence of bits includes subsequence of bits, and each subsequence of bits is unique for each location along the substrate. When the object is at a particular location along the substrate a sensor detects the subsequence of bits at the particular location, and a decoder associates the location of the subsequence at the particular location with the object. The substrate can be a leaky coaxial cable with slits or not, corresponding to the bits, or lane markings on a road.

21 Claims, 7 Drawing Sheets

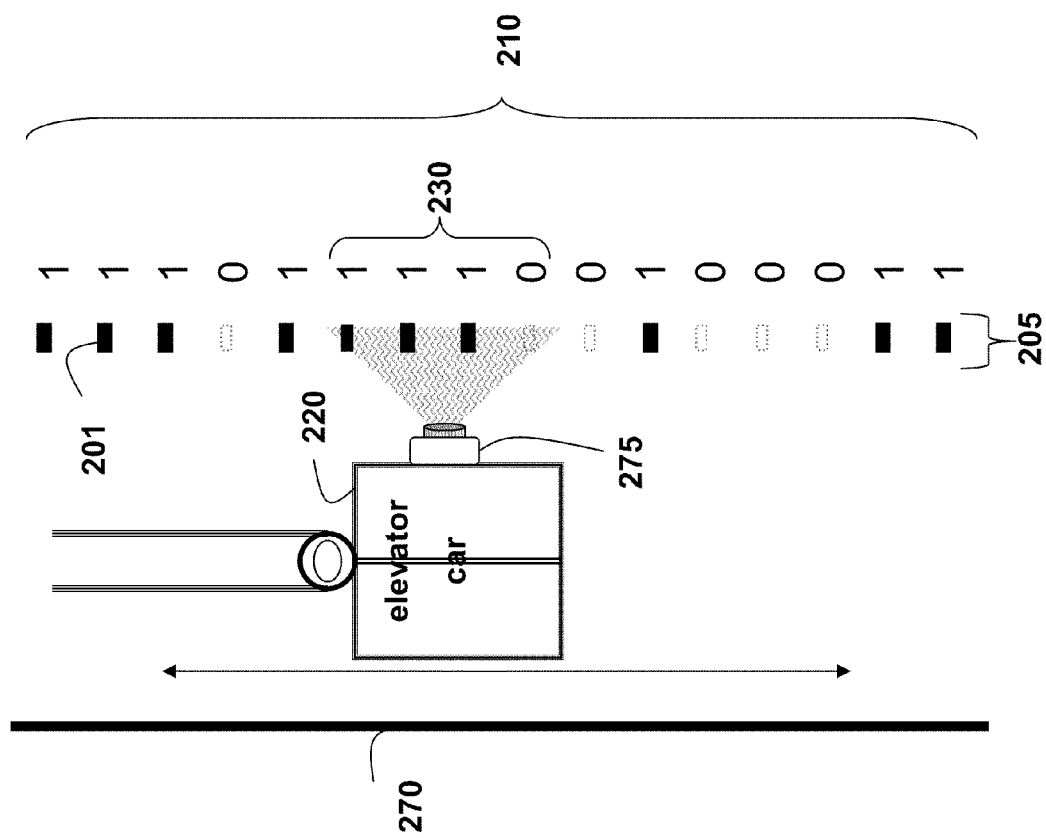

METHOD AND SYSTEM FOR DETERMINING LOCATIONS OF MOVING OBJECTS WITH MAXIMUM LENGTH SEQUENCES

FIELD OF THE INVENTION

This invention relates generally to locating objects, and more particularly to locating moving objects using maximum length sequences.

BACKGROUND OF THE INVENTION

In many applications, it is necessary to locate an object reliably with a high accuracy. For example, in an elevator system, the location of the elevator car must be measured within +/−10 cm between floors and within +/−1 cm at each floor. To achieve this accuracy, elevator systems employs a large number of location sensors in the form of switches. The installation and maintenance of switches is time consuming and costly. In addition, it is difficult to determine the location of the elevator car between floors, where there are no switches, in emergency situations.

FIG. 1A shows a conventional leaky coaxial cable 100. The cable includes a conductor 101, a separator 102, and a shield 103. Slits 104 transmit RF signals 105. Dual leaky coaxial cables have been used to detect intruders in surveillance systems. There, the moving object is passive, and the detection depends on a disturbance in the electromagnetic field between the cables, see U.S. Patent Application 2009-0153147, "Intrusion detection system."

SUMMARY OF THE INVENTION

The embodiments of the invention provides a method for determining a location of a moving object using a signal encoded in a substrate according to a maximum length sequence (MLS).

In one embodiment, a radio frequency (RF) signal is transmitted through a leaky coaxial cable having slits spaced apart according the MLS. An RF sensor at the moving object detects subsequences of the RF signals. A decoder correlates the subsequences of the MLS as the object moves along the cable. The subsequences are unique for each location along the cable. In one application the cable is placed on a wall in an elevator shaft, and the RF sensor is arranged on an elevator car.

In another embodiment, the MLS is used to construct a binary arrangement of white and black marks on a surface, such as a road or elevator shaft. In this case, a camera sensor at the moving object detects the subsequences for the decoder. The arrangement can be multi-dimensional.

BRIEF DESCRIPTION OF THE DRAWINGS

FIG. 2B is a schematic of an image pattern with a physical arrangement of marks encoding the MLS according to embodiments of the invention;

DETAILED DESCRIPTION OF THE PREFERRED EMBODIMENTS

Figure 1A:
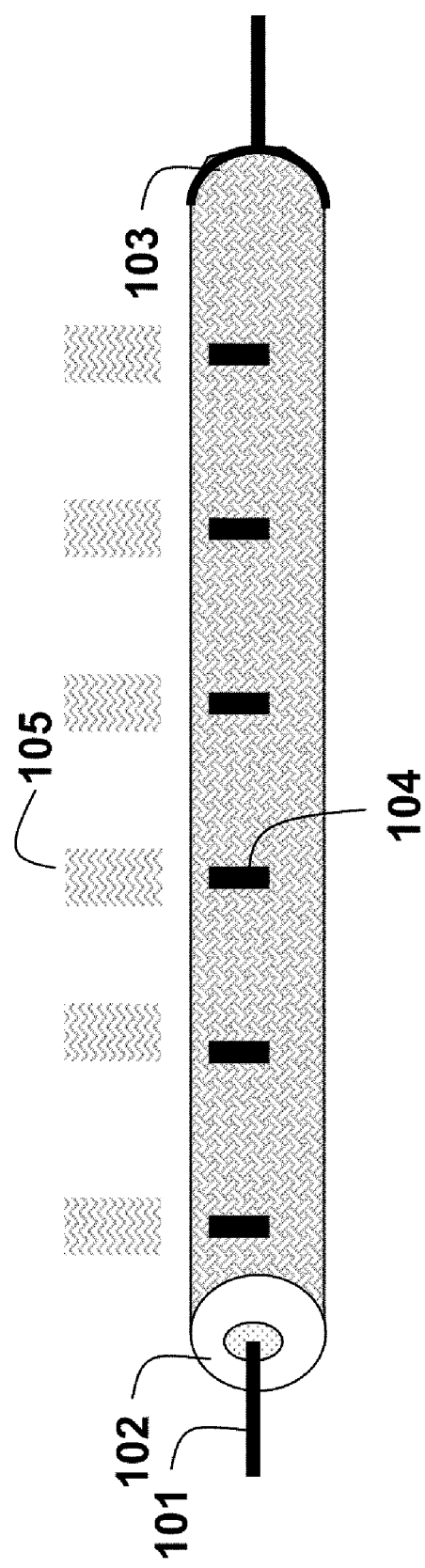
FIG. 1A is a schematic of a conventional leaky coaxial cable.
Figure 1B:
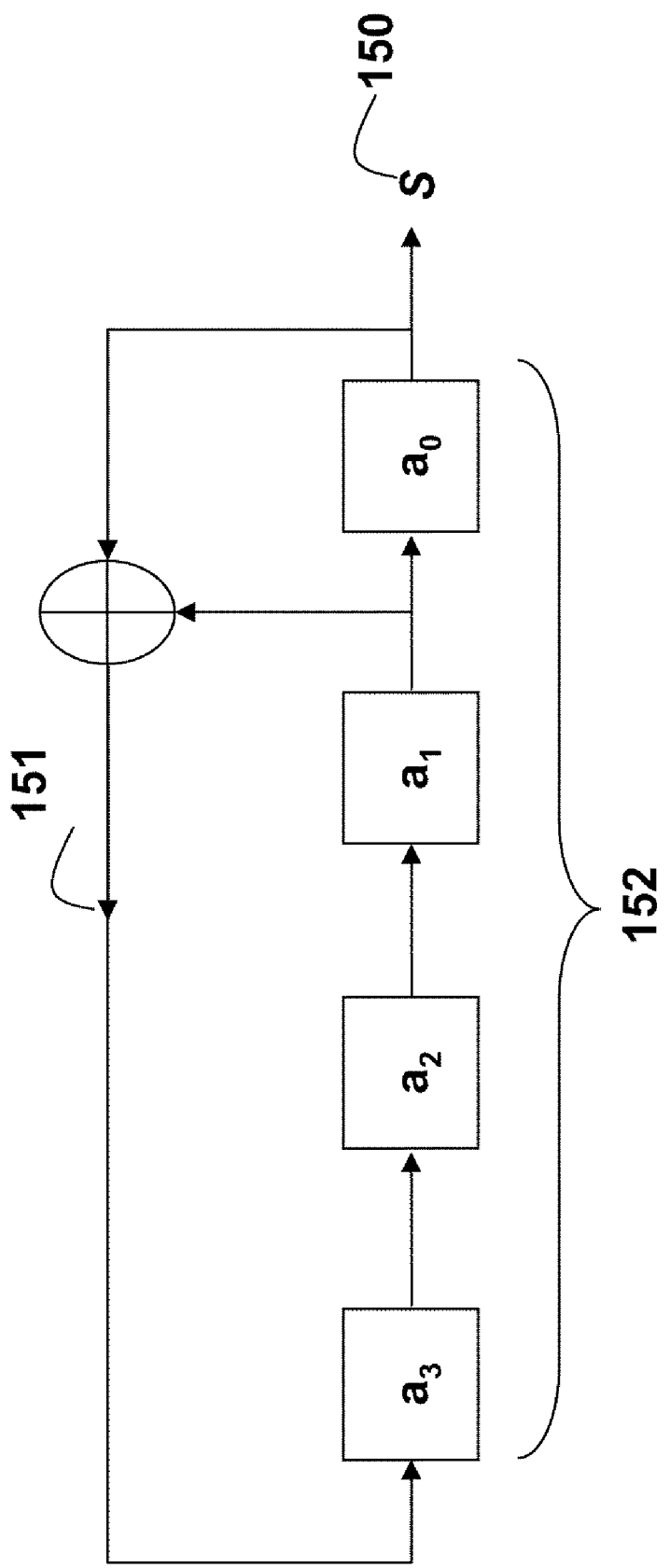
FIG. 1B is a block diagram of a maximal linear feedback shift registers for generating a maximum length sequence (MLS) according to embodiments of the invention.

FIG. 1B shows a maximal linear feedback shift registers (LFSR) $a_0$-$a_3$ 152 with M states for generating a maximum length sequence (MLS) S 150 used by embodiments of the invention. The MLS includes overlapping unique subsequences. The next input bit to the LFSR is a linear function of a previous state of the LFSR. With appropriate feedback 151, the LFSR can produce long pseudorandom sequences.

The MLS has been used for measuring impulse responses, encryption, simulation, correlation technique, time-of-flight spectroscopy, and for synchronizing terminals in direct-sequence spread spectrum and frequency-hopping spread spectrum transmission networks.

We use the MLS to locate objects.

Figure 2A:
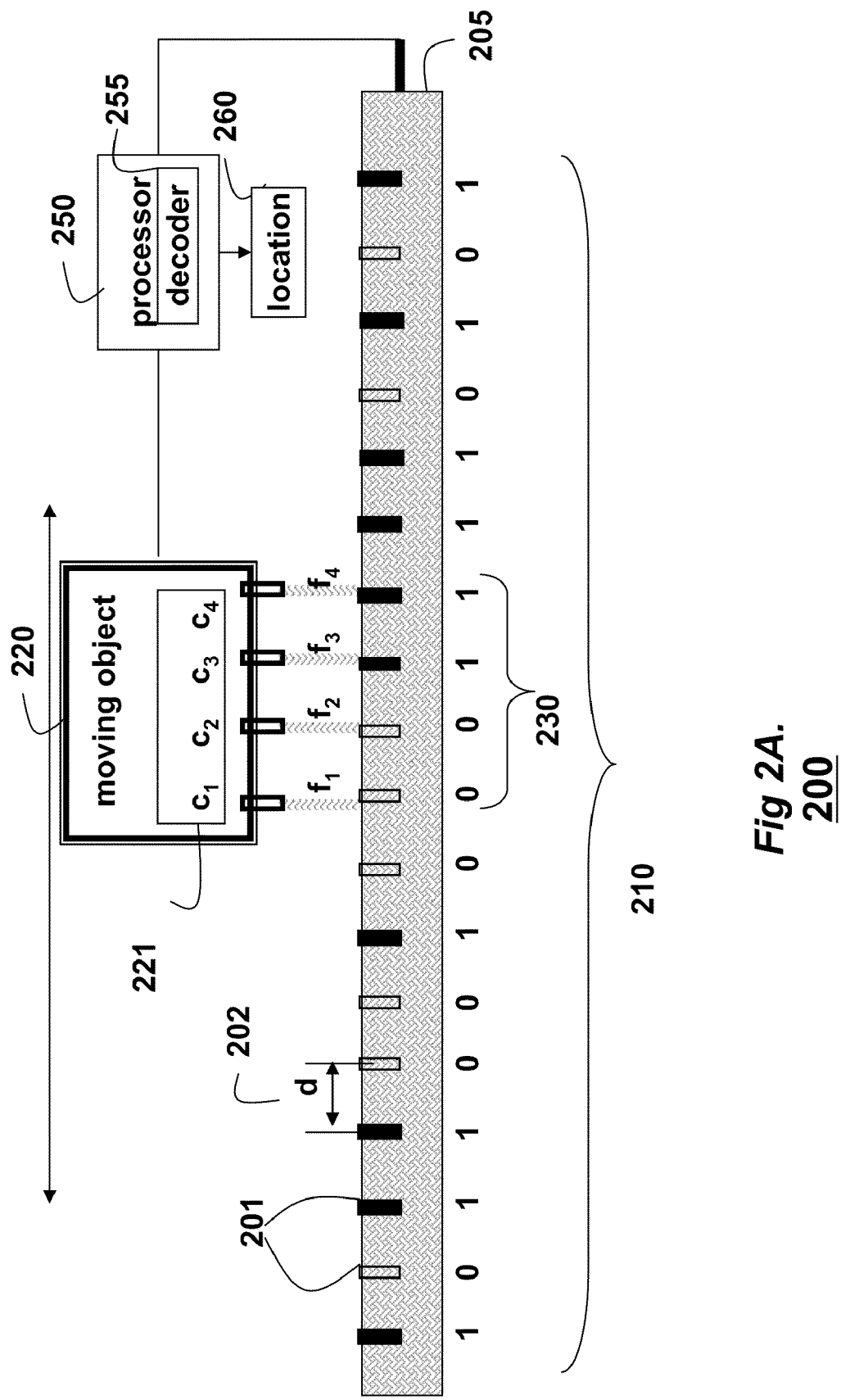
FIG. 2A is a schematic of a leaky coaxial cable with a physical arrangement of slits encoding the MLS according to embodiments of the invention.

FIGS. 2A-2B show a method and system for determining locations of objects with maximum length sequences encoded in a substrate 205.

FIG. 2A shows a leaky coaxial cable 200 according to embodiments of our invention. The cable has B physical locations 201 uniformly arranged along the cable at distances d 202. The presence and absence of slits at the locations are encoded according to the maximum length sequence (MLS) 210. Slits represent one bits, and no slits represent zero bits. For unique locations, we let $B \leq 2^M + M - 2$, where M is the number of states in the LFSR that generates the MLS. The B bits can be taken from any subsequence of the MLS, where the value of bit k is $$V(k) = c((k-1) \mod 2^M - 1) + 1,$$

where mod is the modulo operator.

An object 220 is placed along the physical arrangement on the coaxial cable. The object includes a RF sensor (receiver) 221 with a set (one or more) of N antennas ($c_1$-$c_4$). The antennas are also spaced at the distances d. The sensor detects subsequences of N bits using the RF signals $f_1$-$f_4$ 230, e.g., a subsequence of bits {0 0 1 1 1}.

The subsequence is unique for every location k, where $1 \leq k \leq 2^M + M - N - 1$, along the MLS physically encoded in the cable when $N \geq M$. A decoder associates the location of the subsequence with the object. If the object is moving, the decoder can determine multiple locations.

Received signals $f_3$-$f_4$ aligned with slits have a much greater power than the signal $f_1$ and $f_2$ that are not aligned with a slit. A processor 250 includes a decoder 255 for correlating the subsequence 230 with the MLS 210 to determine the location 260 of the moving object.

It should be noted that the transmitter and sensor can be reversed, i.e., the object includes a transmitter and the set of antennas, and the coaxial cable receives the RF signals. In the reverse scenario, the antennas transmit the different RF signals ($f_1$-$f_4$), and the slits allow only certain signals to be combined and be detected by the sensor at one end of the cable.

FIG. 2B shows the arrangement of bits on the wall in an elevator shaft 270. In this case the moving object is an elevator car, and the bits are indicted by black and white marks on a surface. In this embodiment, the sensor can be a camera 275.

Figure 3:
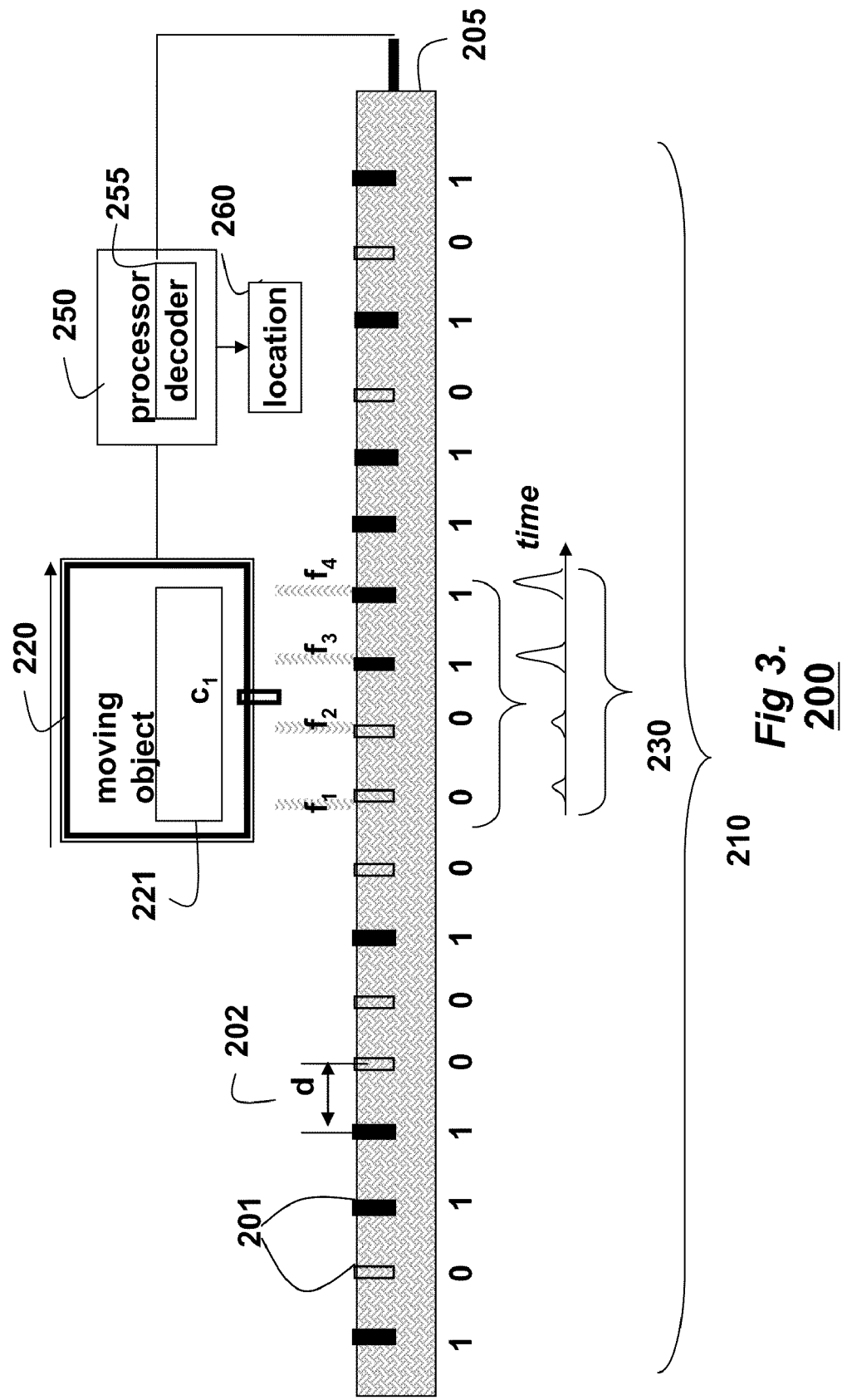
FIG. 3 is a schematic of detecting a subsequence of the MLS one bit at a time

As shown in FIG. 3, the locating can also be performed with a sensor (or transmitter) that has a single antenna $c_1$. In this implementation, the sensor detects the subsequence 230 sequentially over time. The antenna can also be a set of antennas that form a linear array and are capable of beam steering. In such case, the sensor scans the beam in the range of N slits ($f_1$-$f_4$).

Figure 4:
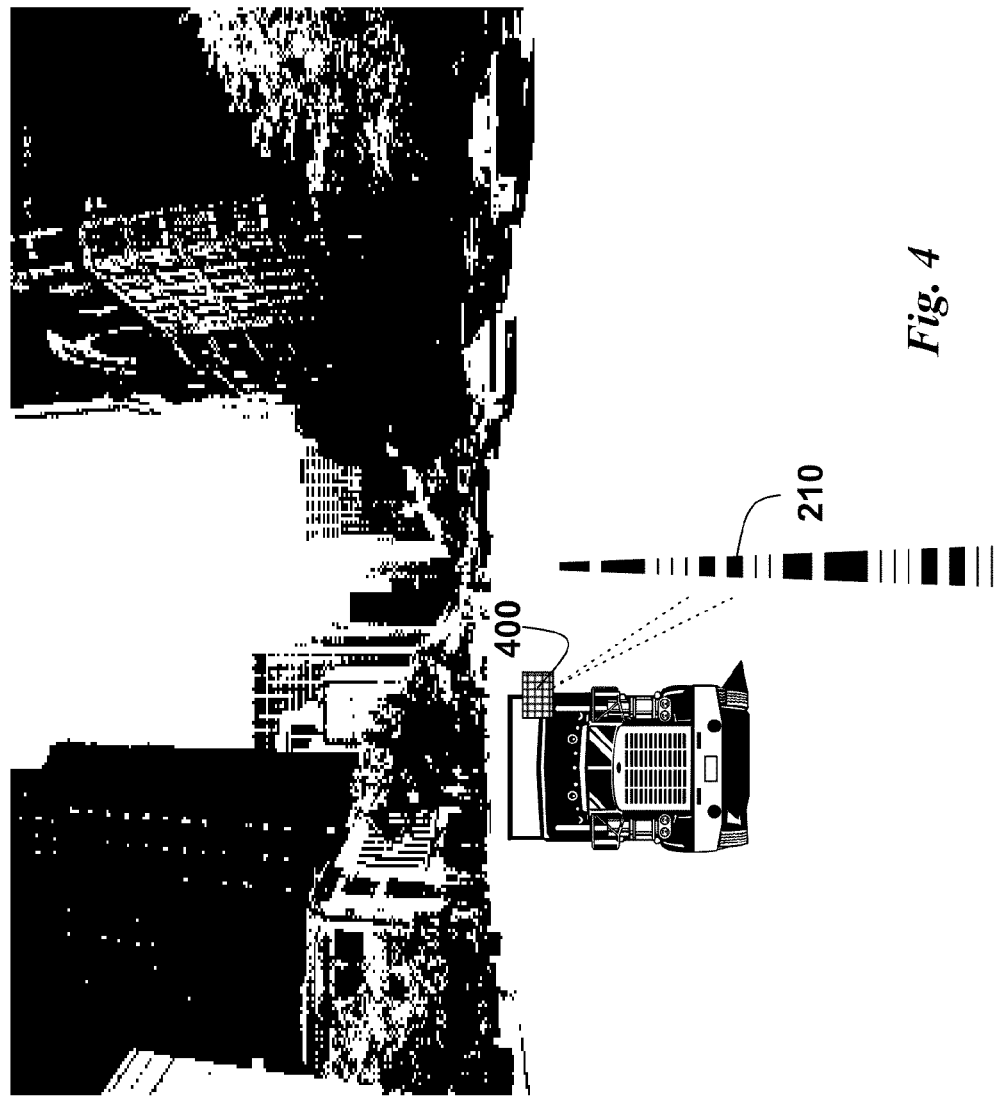
FIG. 4 is a schematic of a MLS constructed on a surface.

As shown in FIG. 4, the MLS 210 is a binary arrangement of two different sets of marks according to an MLS constructed on a surface, such as a road or elevator shaft. The marks can be different colors, shapes, texture, reflectivity, e.g., black and white marks. In this case, a camera sensor 400 on the moving object, e.g., a vehicle, detects the subsequences for the decoder. The bits can also be distinguishable in the infrared range by an infrared camera so that the bits are visible by the eye.

Figure 5:
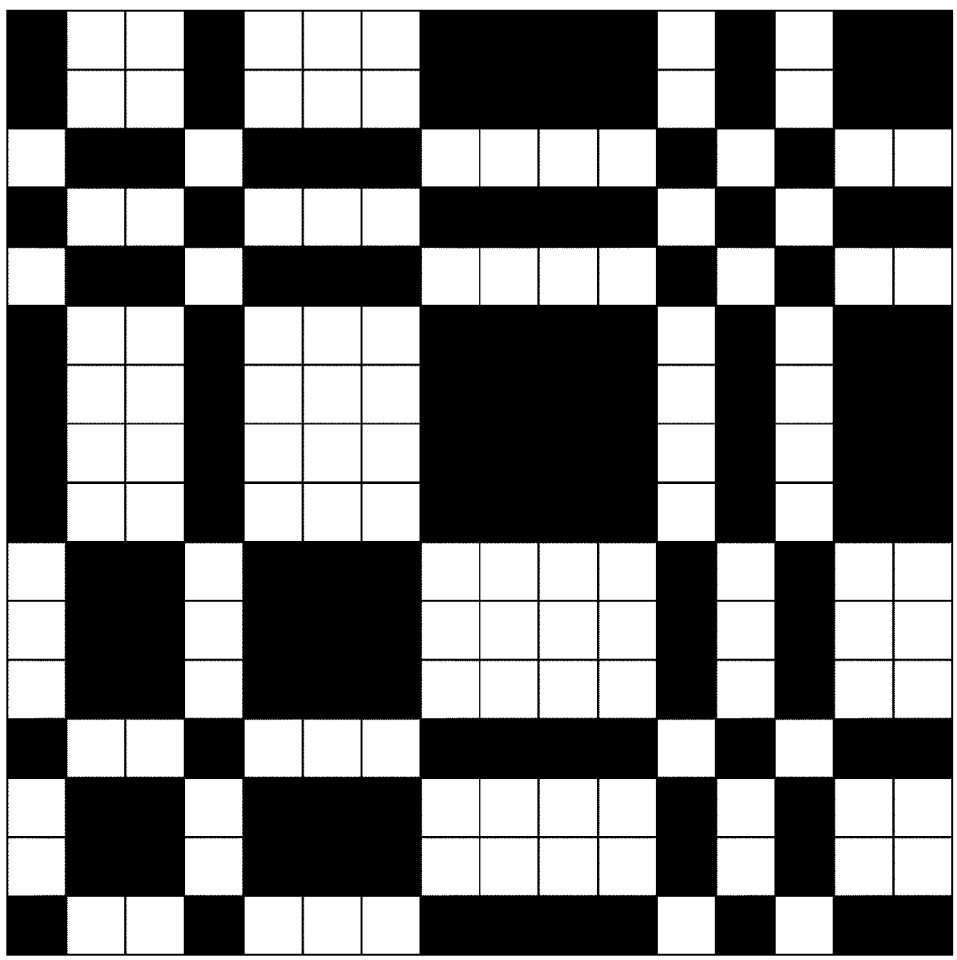
FIG. 5 is an example of a binary arrangement encoding a differential multi-dimensional maximum length sequence.

While the MLS can be used to decode one-dimensional locations, a direct application of MLS for two-dimensional locations is difficult. Hence, we describe differential MLS for obtaining multi-dimensional locations, as shown in FIG. 5.

In one dimension, the differential MLS is constructed using a MLS with M states and $2^M-1$, $C^1=c_1^1, c_2^1, c_3^1, \ldots, c_{2^M-2}^1, c_{2^M-1}^1$. The corresponding differential MLS with $2^M$ bits is $$d_i = \begin{cases} c_i^1 \oplus d_{i-1} & \text{if } 1 \leq i \leq 2^M - 1 \\ 0 \text{ or } 1 & \text{if } i = 0 \end{cases}, \quad (1)$$

where $\oplus$ denotes the XOR operation. The differential MLS changes values of consecutive bits when the corresponding MLS has a value '1', and remains unchanged when the corresponding MLS has a value '0'. For example, an MLS with M=4 is 101100100011110, and the corresponding one-dimensional differential MLS is 0110111000010100, using an initial value of 0 for bit 0.

$$c_i^1 = d_i \oplus d_{i-1} \; \forall 1 \leq i \leq 2^M - 1. \quad (2)$$

In this implementation, the sensor detects a subsequence of at least M+1 bits of the differential MLS, and the decoder performs an XOR operation on adjacent bits to determine the location according to Equation (2).

The two-dimensional differential MLS of FIG. 5 is constructed using the 1-D differential MLS, and a second MLS. If the bits of the 2-D differential MLS are $d_{i,j}$, $0 \leq i \leq 2^{M_2}-1$, $0 \leq j \leq 2^{M_1}-1$, and the MLS generated with $M_2$ states is $C^2 = c_1^2, c_2^2, c_3^2, \ldots, c_{2^M-2}^2, c_{2^M-1}^2$, then $$d_{i,j} = c_i^2 \oplus d_{i-1,j} \; \forall 1 \leq i \leq 2^{M_2}-1, 0 \leq j \leq 2^{M_1}-1, \quad (3)$$

where $d_{0,j}$ is the 1-dimensional differential MLS $C^1$ in Equation (1). For the same column, the bits on consecutive rows of the differential 2-D MLS change when the corresponding MLS $C^2$ takes on the value '1', and the bits on consecutive rows of differential 2-D MLS are unchanged when the corresponding MLS takes on the value '0'.

To determine a 2-D location, the sensor detects M+1 consecutive bits in each dimension to be decoded. The decoder can also decode one bit at a time, similar as shown for FIG. 3. The accuracy is improved when previously decoded locations are used.

In general, a Q-dimensional differential MLS, where $Q \geq 2$, can be constructed iteratively using the (Q-1)-dimensional differential MLS. If the (Q-1)-dimensional differential MLS is $d_X$, where X is a (Q-1)-dimensional vector, and a Q-dimensional differential MLS corresponding to the MLS $C^Q$ generated using $M_Q$ states is $d_{i,X}$, then the Q-dimensional differential MLS is $$d_{i,X} = c_i^Q \oplus d_{i-1,X} \; \forall 1 \leq i \leq 2^{M_Q}-1, X \in S_{Q-1} \times S_{Q-2} \times \ldots \times S_1, \quad (4)$$

where $S_j = \{0, 1, \ldots, M_j\}$

The decoder infers $M_j$ consecutive bits in dimension j, for all j=1, 2, …, Q. The XOR operation is used to determine the Q-dimensional location.

The '1' of the differential code can be represented as a slit in the leaky coaxial cable, or a white mark. The '0's can be represented by no slit in the cable or a black mark. The MLS can also be displayed or projected as an arrangement of pixels on a screen. The bits can also be magnetically encoded, or as colors on a displayed image.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system for determining a location of an object, comprising:
   a substrate including a sequence of bits, wherein the sequence of bits is physically arranged on the substrate and the sequence of bits includes overlapping subsequences of bits, and wherein each subsequence of bits is unique for each location along the substrate;
   an object at a particular location along the substrate, wherein the substrate is a coaxial cable, wherein the sequence of bits are formed as slits and no slits in the coaxial cable;
   a sensor configured to detect the subsequence of bits at the particular location of the object; and
   a decoder configured to associate the location of the subsequence of bits at the particular location with the object.

2. The system of claim 1, wherein the object is moving, and further comprising:
   associating a plurality of locations with the object as the object is moving along the substrate.

3. The system of claim 1, wherein the sequence of bits is a maximum length sequence (MLS).

4. The system of claim 3, wherein the sequence of bits is generated by a maximal linear feedback shift registers (LFSR).

5. The system of claim 3, wherein the location is in a Q-dimensional space, and the location is determined by subsequences in Q independent maximum length sequences, there being one independent maximum length sequence for each dimension.

6. The system of claim 4, wherein the LFSR has M states, wherein the sequence of bits has $B \leq 2^M + M - 2$ bits and each subsequence has N bits, wherein there are k locations, and wherein $1 \leq k \leq 2^M + M - N - 1$.

7. The system of claim 1, wherein the coaxial cable transmits a radio frequency signal at the slits, wherein the subsequence of bits includes N bits and the sensor includes a set of N receive antennas to detect the subsequence of N bits.

8. The system of claim 7, wherein the set of N antennas perform beam steering over the subsequence of bits.

9. The system of claim 1, wherein the object includes a set of N transmit antennas for transmitting radio frequency signals, and the sensor is connected to the coaxial cable.

10. The system of claim 1, wherein the bits are evenly spaced apart at a known distance.

11. The system of claim 1, wherein the sensor includes one antenna, and the subsequence of bits is detected over time as the object moves along the substrate.

12. The system of claim 1, wherein the substrate includes a surface and the sequence of bits are formed as marks on the surface, and the sensor is a camera mounted on the object to acquire images of the sequence of bits.

13. The system of claim 12, wherein the surface is a road.

14. The system of claim 1, wherein the bits are distinguishable by color.

15. The system of claim 1, wherein the bits are distinguishable by shape.

16. The system of claim 1, wherein the bits are distinguishable in an infrared range.

17. The system of claim 1, wherein the bits are distinguishable by reflectivity.

18. The system of claim 1, wherein the bits are distinguishable by texture.

19. The system of claim 1, wherein the bits are distinguishable magnetically.

20. The system of claim 1, wherein the substrate is located in an elevator shaft, and the object is an elevator car.

21. A method for determining a location an object, comprising a processor for performing steps of the method, comprising the steps of:
arranging a sequence of bits on a substrate, wherein the sequence of bits includes overlapping subsequences of bits and each subsequence of bits is unique for each location along the substrate, wherein the substrate is a coaxial cable, wherein the sequence of bits are formed as slits and no slits in the coaxial cable;
sensing the subsequence of bits at a particular location of an object;
decoding the location of the subsequence of bits at the particular location; and
associating the location of the subsequence of bits at the particular location with the object.

* * * * *